United States Patent [19]

Bianchi

[11] Patent Number: 4,771,669
[45] Date of Patent: Sep. 20, 1988

[54] PROGRAMMABLE CORNER CUTTER
[75] Inventor: Roberto Bianchi, Bologna, Italy
[73] Assignee: F.I.M. S.r.l., Bologna, Italy
[21] Appl. No.: 879,778
[22] Filed: Jun. 27, 1986
[30] Foreign Application Priority Data Jun. 28, 1985 [IT] Italy ............................ 21346 A/85

[51] Int. Cl.⁴ .......................... B26D 7/01; B26D 7/26
[52] U.S. Cl. .................................. 83/467 R; 83/559; 83/618; 83/693; 83/696; 83/917; 269/305; 269/319
[58] Field of Search ..................... 83/467 R, 468, 559, 83/560, 618, 640, 641, 917, 696; 269/303, 305, 315, 319, 37, 41

[56] References Cited
U.S. PATENT DOCUMENTS 3,592,093  7/1971  Cantelli ................................ 83/917
3,996,829 12/1976  Tromponi ............................. 83/696
4,200,019  4/1980  Fazis ................................ 83/467 R
4,433,600  2/1984  Ikeda ................................... 83/468
4,450,881  5/1984  Buttner ................................. 83/468

Primary Examiner—E. R. Kazenske
Assistant Examiner—Hien H. Phan
Attorney, Agent, or Firm—Armstrong, Nikaido, Marmelstein & Kubovcik

[57] ABSTRACT

A corner cutting machine for notching corners out of plate stock located on a work table by means of upper and lower knives arranged at an angle to form a V-shaped cutting edge. Work piece stop and positioning edges are mounted to adjustment heads which are mechanical for remotely controlled motor driven longitudinal movement in converging slots provided in the work table and rotary movement relative to the work table.

22 Claims, 7 Drawing Sheets

PROGRAMMABLE CORNER CUTTER

The invention relates to a corner cutter for blanking corners out of plate stock, more particularly sheets or plates with a work table having a flat, preferably horizontal, surface, with preferably two pairs of knives consisting of top knives and bottom knives arranged at a preferably adjustable angle in relation to each other to form a V-shaped cutting edge, and with at least two automatically adjustable stop ledges guided in guide slots of the work table for longitudinal displacement for positioning the plate to be blanked out.

Such corner cutters facilitate significantly the blanking of corners out of sheets, plates and the like. It is particularly necessary to blank out corners in order to make box-shaped articles from sheets or plates. Thus, for example, generally square corners are blanked out at all four corners of a rectangular sheet or plate, then the four remaining flaps or tongues arising on the lateral edges of the sheet or plate are turned down, so that a box is formed.

The sheets or plates are made to bear against the stop ledges for the cutting. To this end, these stop ledges must be positioned with precision and are in each situation fixed in the proper position, which is extremely time consuming and labor intensive if different notches are to be cut one after the other.

West German Pat. No. 19 34 847, which corresponds to U.S. Pat. No. 3,592,093 teaches a corner cutter in which, in order to simplify the positioning of the stop ledges, each of the ledges on the surface of the work table is displaced longitudinally by means of a piston-type cylinder setup in a guide slot of the work table. Angular adjustment of the stop ledge is made possible by connecting the piston-type cylinder setup that displaces the ledge with the stop ledge via a swivel mounting whose axis is normal to the surface of the work table, and placing in parallel with the piston-type cylinder setup a stop bar likewise connected to the stop ledge via a swivel mounting. Longitudinally adjustable stop rings whose length determines the angular position of the stop ledge are fitted to the stop bar. However, because of the single preliminary adjustment, this construction succeeds in causing the stop ledge to reciprocate automatically between two end positions only, but since often more than two different corners are to be blanked out of one sheet or plate, time-consuming adjustment work of the stop ledges is again necessary in such cases. Furthermore, the arrangement described above is elaborate and expensive due to the necessary pneumatic or hydraulic components.

Another corner cutter is known and described in West German Pat. No. 27 23 432, in which, compared to the construction described above, the stop bar is replaced by another piston-type cylinder setup, which is supposed to lead to the advantage of greater accuracy of adjustment. However, compared to the construction with only one piston-type cylinder setup, this corner cutter is more elaborate and, hence, more expensive.

Accordingly, the present invention has as its object the provision of a corner cutter of the type described in the introduction whose stop ledges can be adjusted automatically and sequentially with greater accuracy and in as many positions as desired, and which is of simpler construction than the corner cutters of known construction. Moreover, this corner cutter shall preferably be programmable for successive blankings of corners of different sizes.

According to the invention, this object is achieved by the features defined in the characterizing clause of claim 1.

In particular, if the drives are electric motors, all the adjustments can be controlled by a computer, which is programmed only once and which subsequently causes the proper adjustments to be made with precision. Therefore, the corner cutter embodying the invention is particularly suitable for such applications in which a series of different operations recur at equal intervals.

Other advantageous features of the invention are set forth in the subclaims.

The invention will be described with reference to the accompanying drawing with reference to a practical embodiment of the invention, in which.

Figure 1:
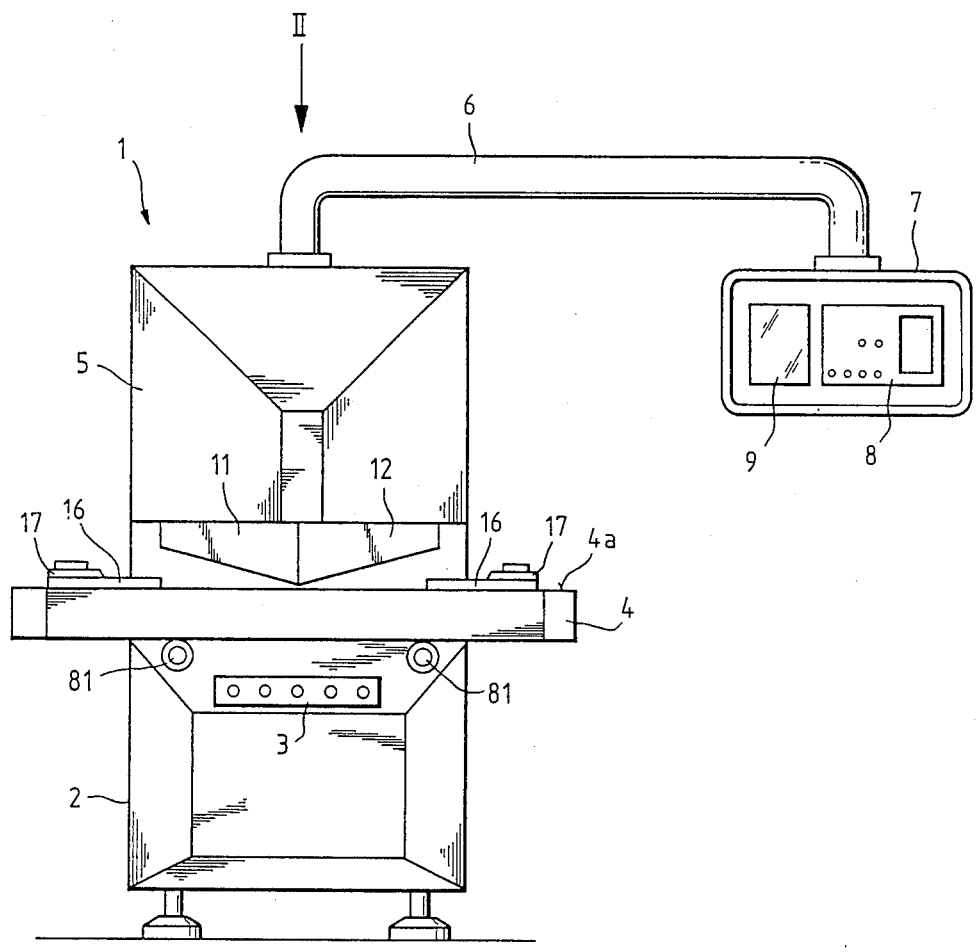
FIG. 1 is a front view of a corner cutter incorporating the invention.

A corner cutter 1 incorporating the invention comprises a supporting frame 2 containing, in particular, mechanical and hydraulic drive means for effecting the cut, and a switch 3 for commissioning corner cutter 1 of the invention, a work table 4 arranged on the supporting frame 2, as well as an upper part 5 carrying a control unit on a pivoted arm 6. The control unit 7 has an operator's control panel 8 and a display unit, more particularly a monitor 9.

Figure 2:
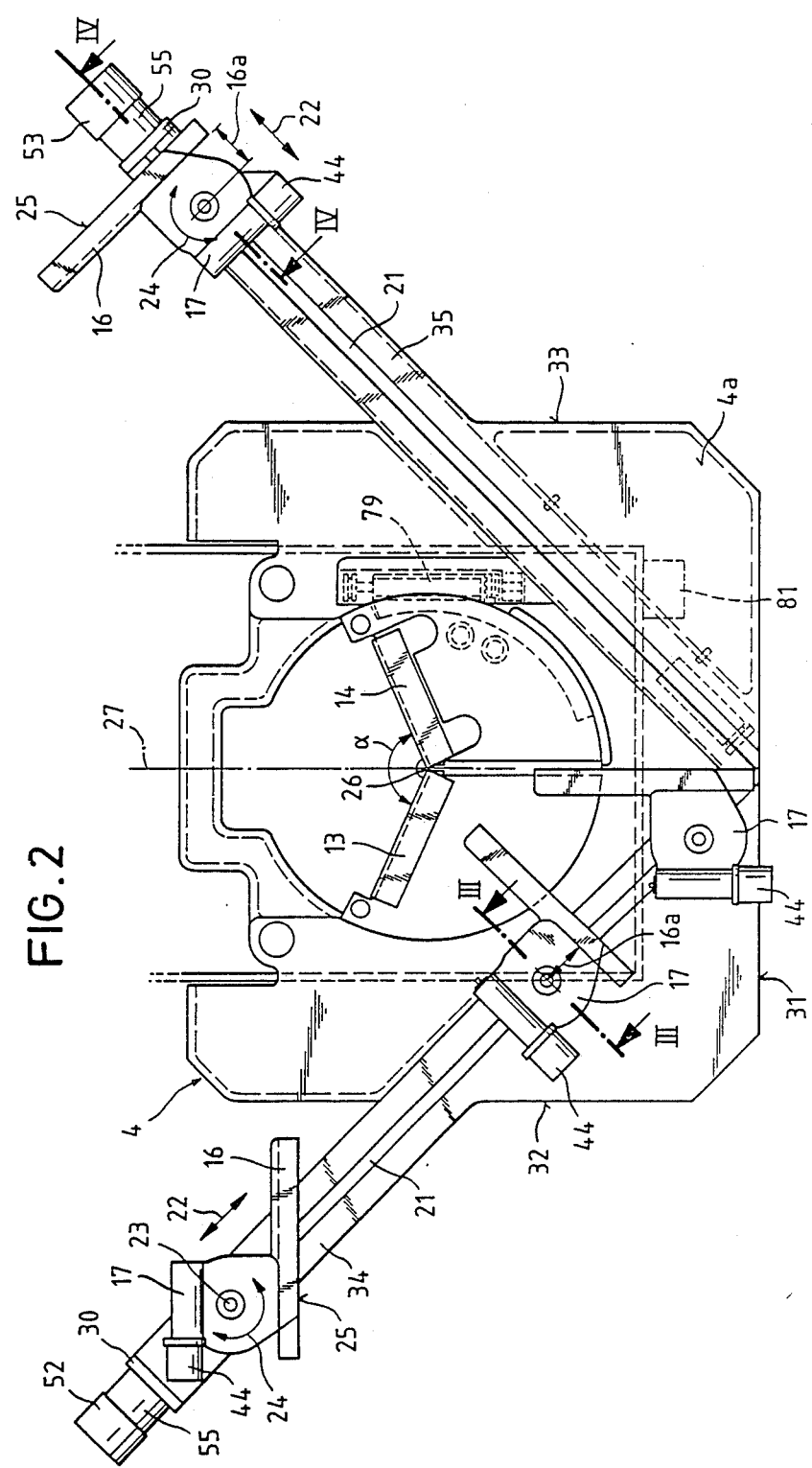
FIG. 2 is plan view of the work table viewed from the arrow II in FIG. 1.
Figure 8:
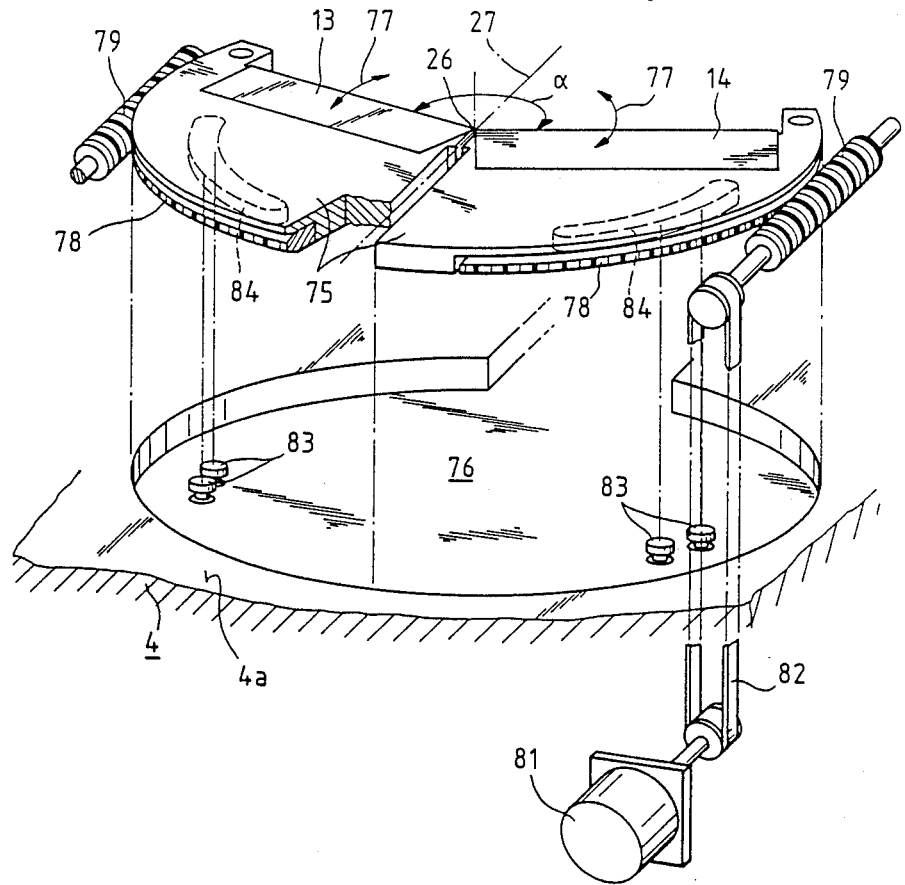
FIG. 8 is a perspective exploded view of the bottom knife setup.

The upper part 5 carries top knives 11, 12 angularly disposed to each other and moving in the direction of the work table 4 for the cutting, while corresponding bottom knives 13, 14 (FIGS. 2 and 8) are arranged in the work table 4, with the knives 11, 12 and 13, 14 cooperating in the manner of a cutter.

To adjust the angular arrangement of the knives 11 or 12 to the knives 12 or 14, the top knives 11, 12 are so attached to each other via suitable mechanical connectors as to be in alignment with each other, so that each pair of knives 11, 13 and 12, 14 can only be moved together.

The work table 4 carries on its flat, horizontal surface 4a two stop ledges 16 which, according to the invention, are each attached to an adjustment head 17. Each adjustment head 17 is both longitudinally displaceable in a rectilinear guide slot 21 of the work table 4 (cf. double arrows 22 in FIG. 2) and pivotable about an axis 23 (FIG. 3) normal to the plane of the work-table surface 4 (cf. the double arrows 24). To clarify these movements, there are shown on the left side of FIG. 2 three adjustment heads 17 in various positions, although, needless to say, in each guide slot 21 there is actually only one adjustment head 17. The stop ledge 16 is fitted to the adjustment head 17 spaced a distance 16a laterally from the axis 23 and extends at right angles to the vertical distance 16a or in a tangential arrangement to a circular arc determined by the rotation of the adjustment head 17. In addition, it is attached to the adjustment head 17 in parallel with, and directly fastened to, the work-table surface 4a, resulting in flat vertical surfaces 25 for bearing the edges of a sheet or plate (not shown) fitted to the work table 4.

The guide slots 21 enclose between them an angle preferably of 90° and—in relation to the center line 27 of the work table 4 running in the plane of the work-table surface 4a through the tip 26 of the V-shaped cutting edge—are arranged convergently both symmetrically and in the direction of the front edge (31) of the work table (4). As a result of this advantageous arrangement, practically any sheet or plate to be blanked out can be aligned with a high degree of precision in the position proper for the cut in terms of adjustability of the stop ledges 16. The sheet or plate must not absolutely have rectangular edges.

For particularly large sheets or plates that are to be fashioned, it is of advantage for the work table 4 to have on its lateral edges 32, 33 bars 34, 34 in or on which guide slots 21 continue.

As can be seen from the cross section illustrated in FIG. 3, starting from the work-table surface 4a, each guide slot 21 extends at right angles into the work table 4 and flares on both sides below the surface 4a to form a guide channel 39 with a preferably rectangular cross section. This guide channel 39 is delimited in the direction of the work-table surface 4a by two opposing guide bars 36, whose upper side lies in the plane of the work-table surface 4a. The guide bars 36 form between them a guide slot 37 whose function will be described hereinafter. In the practical embodiment shown, the work table 4 is a relatively thin plate, reason why a U-type section 38 with its arms are integrally attached to its underside opposite the surface 4a. However, in addition to this preferred construction, the guide slot 21 can also be fashioned, particularly milled out, with the above-described cross section consisting of guide slot 37 and guide channel 39, from a plate whose thickness is larger than the depth of the guide slot 21.

Each adjustment head 17 has a slide 41 guided in the guide slot 21, said slide carrying a worm wheel 42 above the work table 4. This worm wheel 42 is rigidly coupled, e.g., screwed, to the slide 41, with its axis coinciding with the axis of rotation 23 of the adjustment head 17 and thus likewise at right angles to the work-table surface 4a. Consequently, the worm wheel 42 lies in a plane which is parallel to the work-table surface 4. The slide 41 and the worm wheel 42 are surrounded in the manner of a bell by a housing 43 which, in plan view, is constructed substantially rectangularly or squarely with side walls (43a, 43b, 43c and 43d) normal to the work-table surface 4a and with an upper wall 43e parallel to the work-table surface 4a. The lower edge of the housing 43, i.e., of the side walls 43a to 43d, rests directly, but preferably via lip seals 40, on the work-table surface 4a. The seals 40 may be made from metal or from a suitable rubber-elastic material. If seals 40 are used, these vertical extensions form the lower edges of the side walls 43a to 43d which, in this case, are spaced a slight distance from the work-table surface 4a.

Figure 5:
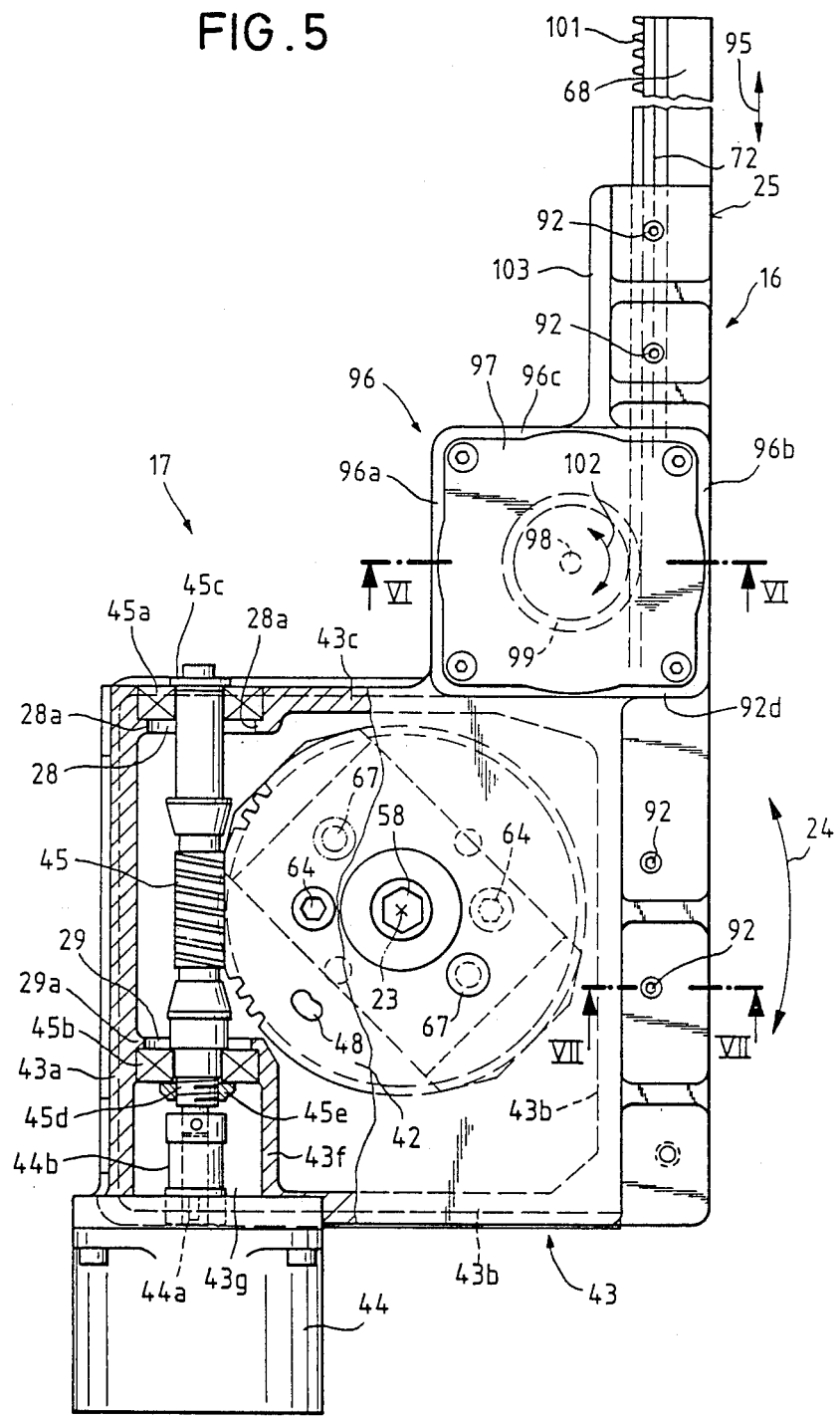
FIG. 5 is a view shown partially in section in the direction of arrow V in FIG. 4.

There is flanged to the housing 43 laterally, i.e. along the side wall 43d, a motor drive 44, whose drive shaft 44a reaches through the side wall 43d and is axially connected via a coupling 44b to a worm drive shaft 45. The worm drive shaft 45 is arranged in parallel with the work-table surface 4a as well as in parallel with the housing side wall 43a and is tangentially in mesh with the worm wheel 42. To this end, the worm drive shaft 45 is pivoted at the level of the worm wheel 42 in the housing 43 via anti-friction or friction bearings 45a, 45b. The bearing 45a is arranged in the area of the side wall 43a adjoining the side wall 43a. Specifically, the side wall 43c has at this point an area with a fairly large wall thickness, in which a bore hole 28 is drilled to receive the bearing 45a In the corner area between the side walls 43a and 43d the housing 43 has on the inside a chamber 43g formed by walls 43f and preferably with a round cross section, into which extends the drive shaft 44a of the motor drive 44 through the side wall 43d, and inside which the coupling 44b is arranged. On the side of the chamber 43g opposite the side wall 43d, the chamber 43g changes into a bore hole 29 with a reduced diameter drilled in the wall 43f and which serves to receive the bearing 45b in an arrangement that is aligned with the bearing 45a. The chamber 43g can be accessed from the side of the side wall 43d for introducing the bearing 45b (without the motor drive 44). As can particularly be seen in FIGS. 3 and 5, the bore holes 28, 29 provided for receiving the bearings 45a, b have on their marginal areas facing each other rotating annular segments 28a, 29a pointing radially inwardly. The worm drive shaft 45 carries on its end lying opposite the motor drive 44 and extending through the bearing 45a an annular shoulder 45c, e.g., a snap ring, which is fitted into an annular groove, and on its end facing the coupling 44b and extending through the bearing 45b in the direction of the motor drive 44 a winding 45d with a nut 45e. The bearings 45a, b are thus urged axially against each other as well as against the ring lands 28a, 29a of the bore holes 28, 29 due to the ring shoulder 45c and the nut 45e.

Contrary to this construction, or in addition thereto, as the case may be, the bearing 45a, 45b can also be shrunk or non-rotatably mounted with other equivalent means.

Due to the construction described above, there follows through rotation of the worm drive shaft 45 a turning of the housing 43 together with the stop ledge 16 attached thereto about the stationary worm wheel 42, i.e., about the axis 23.

The stop ledge 16 is attached to the housing 43 of the adjustment head 17 in the arrangement described above for the work-table surface 4a as well as appropriately in parallel with the worm drive shaft 45 and is on the other side of the axis 23 attached to the side wall 43b of the housing.

For the swivel mounting of the housing 43 free of backlash and free of rock, a spindle 47 is used which is rigidly coupled, preferably screwed, to the slide 41 at right angles to the work-table surface 4, said spindle reaching through a concentric bore hole of the worm wheel 42. The spindle 47 carries on its free end extending over the slide 41 preferably two antifriction bearings 46a, b spaced an axial distance from each other and having outer races that are non-rotatably mounted on the housing 43. The housing has in its upper wall 43e a bore hole with an axial annular land 56. The free end of the spindle 47 carries, directly resting on the worm wheel 42, the bearing 46a, on it the annular land 56 of the housing, the second bearing 46b, and a stress ring 57. By means of a nut 58, the bearings 46 and the annular land 56 are pulled axially against each other via the stress ring 57. A spacing ring 59 also maintains a distance between the inner races of the bearings. Contrary to the construction described above, it is within the scope of the invention to provide the pivotal mounting of the housing 43 by means of friction bearings.

The invention provides for the motor drive 44 a limitation of the rotary motion of the adjustment heads 17. For this purpose (cf. FIG. 5), stop cams 48 are arranged on the upper surface of the worm wheel 42, which cooperate with switches (not shown) provided on the housing interior. However, the invention is not limited to this construction, but also comprises all the means that act equally in the same context for limiting the rotary motion of the adjustment heads 17, such as, for example, an electronic circuit for the direct limitation of the rotary motion of the motor drive 44 in accordance with rotary position of the adjustment head 17 to be scanned, for example, by sensors.

Figure 4:
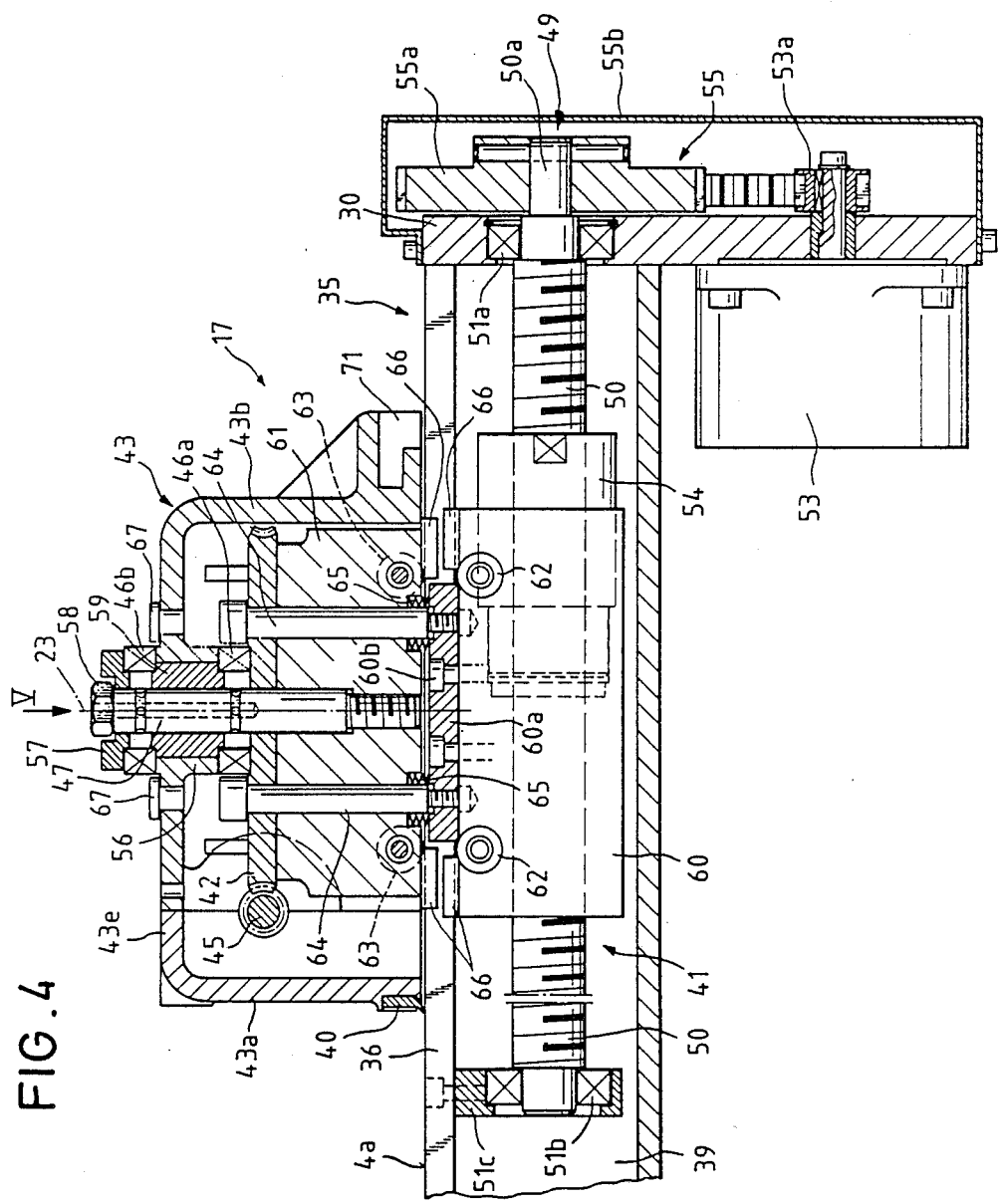
FIG. 4 is a sectional view taken along the line IV—IV of FIG. 2.

A jackscrew actuator 49 is provided for each adjustment head 17 for its longitudinal displacement. To achieve this, there is provided in the guide channel 39 of each guide slot 21 a threaded spindle 50, for which purpose, as shown in FIG. 4, friction and/or antifriction bearings 51 are provided. The bearing 51a is mounted in the end area of the particular lateral work-table shoulder 34, 35, preferably in a lid 30 that closes the guide channel 39 on the end face, and the bearing 51b is arranged to be in alignment with the bearing 51a at the other end of the guide channel 39, for which purpose a bearing pedestal 51c, which projects vertically into the guide channel 39, is provided from the underside of the guide bars 36. At one end, the threaded spindle 50 is mounted in the bearing 51b and has, at the other end, an axial extension 50a jutting out of the bearing 51a and projecting through the lid 30, said extension 50a being friction-locked as by press fitting to a rotary drive. In the example shown, a gear 55a of a gear unit is mounted on the extension 50a, said gear unit 55 being under certain conditions friction-locked with a driving pinion 53a of a motor drive. The gear unit 55 may also be designed as step-up or step-down gears. The motor drive 53 is flanged to an extension of the lid 30 extending downwardly from the guide channel 39, with the motor shaft projecting through the lid extension. Within the scope of the invention, the gears are covered by a lid 55b. Instead of the gear unit 55 consisting of gears, a belt or a toothed belt drive may also be provided, or the motor drive 53 can be coupled directly with the threaded spindle 50.

A threaded sleeve 54 is rigidly coupled with the slide 41 of the adjustment head 17, specifically with its bottom part 60 consisting of a rectangular parallelepipedal block, with the threaded sleeve 54 surrounding the threaded spindle 50. Thus, upon rotation of the threaded spindle 50, there follows a longitudinal displacement of the threaded sleeve 54 together with the slide 41 and thereby also with the adjustment head.

The lower part 60 of the slide 41 is connected to an upper part 61 preferably also consisting of a substantially rectangular parallelepipedal block mounted above the work-table 4. The lower part 60 has on its upper part arranged in the direction of the work-table surface 4a runners 62 which rest on the underside of the guide bars 36, so that they can roll off when the slide 41 moves longitudinally. The upper part 61 of the slide has on its underside runners 63 which rest on the upper side of the guide bars 36, i.e., on the work-table surface 4a and can roll off.

The runners 62 of the lower part 60 are mounted on pins 62 which protrude from the lateral surfaces of the rectangular parallelepipedal lower part 60 at right angles to the longitudinal extension of the guide channel 39 and in a plane parallel to the plane of the work-table surface 4a. In the direction of the slide's 41 movement, the areas of the lateral surfaces bordering on the upper front and rear edge of the lower part 60 are each provided with two runners 62.

Figure 3:
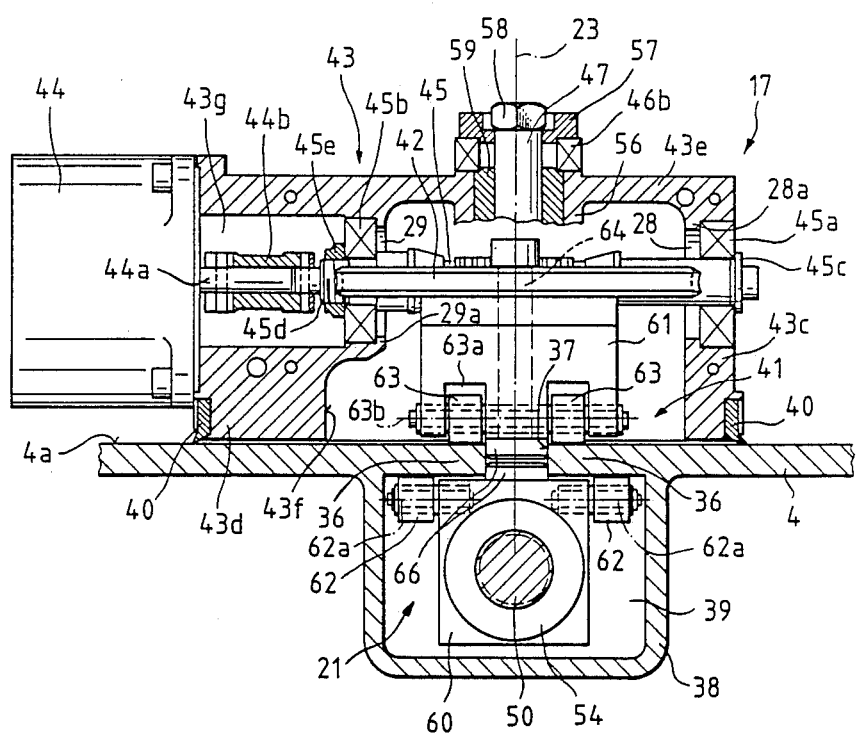
FIG. 3 is a sectional view taken along the line III—III in FIG. 2.

The mounting of the runners 63 of the upper part 61 may be constructed in the same manner, but in the example shown there are provided in the areas bordering on the front and rear edge of the upper part 61, in each case, two depressions or grooves 63a extending vertically upwards into the rectangular parallelepipedal block, so that in the view shown in FIG. 3 substantially E-shaped cross sections result. In each depression 63a there is arranged a runner 63, which towers with its circumference above the underside of the upper part 61. For the swivel mounting of the runners 63 there are provided pins 63b, which are arranged at right angles to the guide slot 37 as well as in a plane parallel to the plane of the work-table surface 44. Preferably, the upper part 61 also lies with four runners 63 on the guide bars 36.

The runners 62 of the lower part 60 are staggered in a direction perpendicular to the guide groove 21 relative to the runners 63 of the upper part, that is to say, the runners 62 of the front and rear pair of rollers of the lower part 60 are spaced a greater distance from each other in a direction perpendicular to the guide groove 21 than the runners 63 of the pairs of rollers of the upper part 61.

The upper part 61 is connected to the lower part 60 by screws 64 projecting through the guide slot 37. Springs, more particularly spiral stress springs 65, are arranged between the upper side of the lower part 60 or of a rectangular parallelepipedal shoulder 60a which projects into the guide slot 37 and is connected by screws 60b to the lower part 60, and the underside of the upper part 61. These spiral stress springs 65 ensure that the runners 62, 63 always rest with a constant preload on the guide bars 36. Preferably, the screws 64 reach through through-holes in the upper part 61 and engage in threads of the lower part 60 or of the shoulder 60a. The through-holes have on the underside of the upper part 61 counterbores, in which the spiral stress springs 65 are arranged to embrace the screws 64. The upper wall 43e of the housing 43 has two bore holes that are in alignment with the screws 64 in a given swivel position of the housing 43 and can be closed with plug 67 and through which the screws 64, even after the adjustment head 17 has been mounted for adjusting the preload between the lower part 60 and the upper part 61, are still accessible to the screws 64. Preferably, the screws 64 are formed as sockethead cap screws.

Viewed in the direction of sliding of the slide 41, the areas of the upper or underside of the lower part 60 and of the upper part 61 have guide shoulders 66 which, facing each other, project into the guide slot 37. The width of the guide shoulders 66 corresponds exactly to the width of the guide slot 37, i.e., to the clearance of the edges of the guide bars 36. Thus, during the longitudinal displacement of the slide 41, the guide shoulders 66 sliding through the guide slot 37 in conjunction with the runners 62, 63 ensure an accurate guidance of the adjustment head 17 in the guide slot 2 which is free of rock, yet is easy of motion.

The longitudinal displacement of the adjustment head 17 can be limited with end stops. This can be done by pro(not shown) which serve for the control of the motor drives 52, 53, i.e. switching them off in the particular end position of the adjustment head 17.

For very large sheets or plates that are to be blanked out, it is also of advantage, in addition to the above-described lateral extension of the guide slots 21 through the bars 34, 35 to make the stop ledges 16, attached to the adjustment heads 17, adjustable in length. The construction of the adjustment head 17 ensuring this adjustability will be explained hereinafter with reference to FIGS. 5, 6 and 7.

The stop ledge 16 is formed by a sliding ledge 68 having an L-shaped cross section and guided with longitudinal displacement parallel to the housing wall 43b. To this end, the housing wall 43b has a bar 69 with a rectangular cross section and extending outwardly directly above the work-table surface 4a, so that the lower area of the housing wall 43b likewise has an L-shaped cross section. The sliding ledge 68 also has an L-shaped cross section. The sliding ledge 68 is turned 180° about its longitudinal axis so that its horizontal L-piece rests on the bar 69 and parallel thereto, and the bar 69 is received in the interior angle of the L-shaped cross section of the sliding ledge 68. The free length of the vertical L-piece of the sliding ledge 68 corresponds to the height of the bar 69. The surface of the vertical L-piece of the sliding ledge 68 opposite the housing wall 43 forms the vertical surface 26 for a sheet or plate to be positioned. The housing wall 43b has a second bar 70 spaced a distance from the bar 69 in a direction at right angles to the work-table surface 4a and parallel thereto. This towers above the first bar 69 in a direction at right angles to the housing wall 43b, the vertical outside surface 70a thereof, however, being in alignment with the upper surface 25 in a direction at right angles to the work-table surface 4a. Between the bar 70 and the sliding ledge 68 there is arranged a guide ledge 71 preferably connected, e.g., screwed, to the bar 70. The sliding ledge 68 has on the upper side of its horizontal L-piece opposite the worktable surface 4a a longitudinal keyway 72, above which in the second bar 70 there are arranged a series of vertical threaded bore holes 91 spaced a distance from one another. Screws 92 engage in these threaded bores 91. Below each screw 92 is arranged a guide ball 93 in the longitudinal keyway 72 and a guide ball 93, a spiral spring 94, whose preload thus can be adjusted by means of the screw 92, being arranged between the end of the screws 92 and the ball 93. The longitudinal keyway 72 is arranged in the area of the so that this piece is urged by a force which is transmitted from the screw 92 via the spring 94 to the ball 93 against the horizontal bar 69 of the housing wall 43b and, in this way, the sliding ledge 68 is guided for sliding in the longitudinal direction thereof, as denoted by the double arrow 95.

To the outside surface of the housing wall 43c there is attached another housing 96 which, in plan view (FIG. 5), is formed rectangularly or squarely with the walls 96a, b, c and d, the wall 96d being substantially in alignment with the wall 43c of the housing 43. The housing 96 carries on its upper surface opposite the work-table surface 4a a motor drive 97, whose shaft 98 is at right angles to the work-table surface 4a and carries a pinion 99. The toothing of this pinion 99 engages in a gear-rack-type toothing 101 of the sliding ledge 68, which is formed on the longitudinal side of the horizontal L-piece opposite the stop surface 25. Thus, a rotation of the pinion 99 by means of the motor drive 97 (double arrow 102) results in a longitudinal displacement of the sliding ledge 68.

Figure 6:
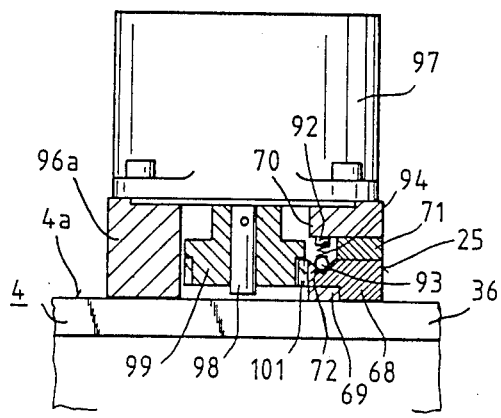
FIG. 6 is a part sectional view taken along the line VI—VI of FIG. 5.
Figure 7:
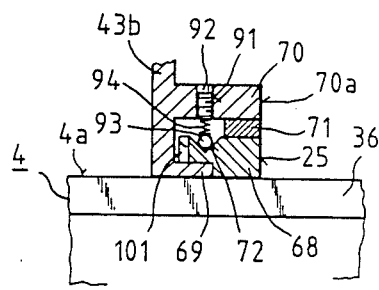
FIG. 7 is a sectional view taken along the line VII—VII of FIG. 5.

On the outside surface of the wall 96c opposite the wall 96d there is attached a wall 103 in alignment with the housing 43b which, similar to the construction of the the housing 43b which, similar to the construction of the wall 43b, likewise has two bars 69 and 70 between which the sliding ledge 68 is guided by means of the guide balls 93 which engages in the longitudinal keyway 72 and is subjected to the preload of the spiral springs 94 brought about by the screws 92. The bars 69 and 70 continue also in the area of the housing 96 (FIG. 6).

Preferably, for the exact longitudinal guidance of the sliding ledge 68 in its longitudinal extension on both sides of the housing 96, there are provided in each case two guide screws 92 with corresponding spiral springs 94 and guide balls 93. This construction ensures both an exact guidance and a simple and rapid exchangeability of the sliding ledge 68, because only the guide screws 92 must be worked loose in order to be able to remove or insert the ledge 68 at right angles to the wall 43b or 103.

According to the invention, the cutting edge angle between the knife pairs 11, 13 and 12, 14 is also adjustable. This adjustment will be commented upon hereinafter with reference to FIG. 8 with the aid of the lower knives 13, 14.

The lower knives 13, 14 are each attached to one of a pair flat knife holders 75 each of which has a peripheral edge in the form of an arc of a circle in an arrangement radial thereto. According to the invention, the knife holders 75 are so supported in the plane of the work table 4 in a circular table recess 76 and are arranged toward each other that—in relation to the center line 27 of the work table 4—they are mirror-symmetrical and can be moved against each other on a circular path to adjust the cutting edge angle alpha between the lower knives 13, 14, as indicated by the arrows 77. To move the knife holders 75, they have along their periphery worm-wheel toothings 78 each of which is in mesh with a tangentially mounted worm-drive shaft 79. In order to permit turning of the worm-drive shafts 79 for the rotational shift of the knife holders 75, they are each preferably connected to a motor drive 81, preferably via drive belts 82. In the table recess 76 there are provided guide shoulders 83 which engage in guide recesses 84, in the form of a circular arc, of the knife holders 75. For reasons of stability, these guide recesses 84 in the practical embodiment shown are only formed on the underside of the knife holders 75. As a result of this advantageous formation, the lower knives 13, 14 are guided with angular adjustment and free of backlash.

Figure 9:
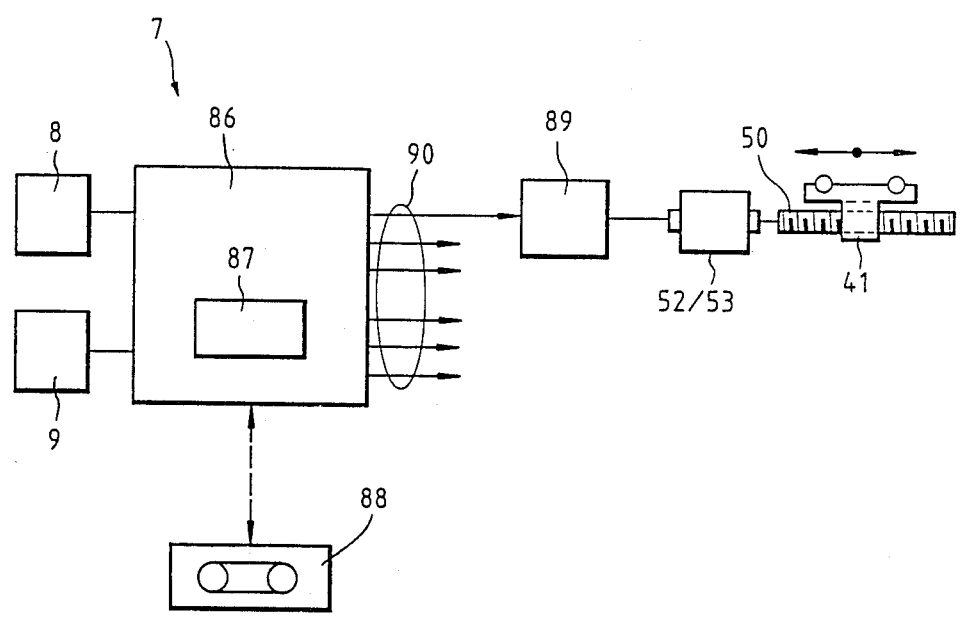
FIG. 9 is a block diagram of the control of a corner cutter as taught by the invention.

According to the invention, all motor drives 44, 52, 53, 97, 81 are preferably electric motors and, more particularly, numerically controlled step motors, advantageously, these motors are fixedly connected via connecting cables to the control unit 7 with programmable numerical control (cf. FIGS. 1 and 9). Thus, the sequences of operations, i.e., all necessary adjustments of the stops and of the cutting edge angle, which vary for the blanking of angle irons from a sheet or plate, can be automated or programmed.

FIG. 9 shows a block diagram showing the control unit 7, for example for one of the controlled pins, namely, the linear-displacement pin of one of the two adjustment heads 17. A computer 86 with a storage 87, the operator's control panel 8, the monitor 9 and, under certain conditions, an additional storage unit 88 is connected via a motor control 89 to the motor 52/53, as a result of whose rotation, the threaded spindle 50 is also rotated, thereby producing the sliding motion of the slide 41. For each motor 44, 52, 53, 97, 81 provided, there is a separate control channel 90.

The numerically controlled step motors employed have neither brushes nor gear units, which has a positive effect on their durability. They ensure a drive in both directions of rotation by certain angular increments (e.g. 1°, 8°) under the influence of short current pulses. Preferably, they receive a pulsed voltage with a frequency of approximately 1000 Hz to 1500 Hz, as a result of which they produce a substantially homogeneous rotary motion. It is of advantage if, for the positioning of the adjustment heads 17 and/or for the adjustment of the cutting edge angle the motors are first receive a high-frequency voltage, because this leads to an acceleration of the adjustment. However, for fine adjustment the frequency is reduced continuously or in steps, which results in a faultless positioning.

The invention is not limited to the practical embodiment shown above, but includes all the means that act equally within the scope of the invention.

I claim:

1. In a claim cutting machine for notching corners out of plate stock of the type which includes a work table having a flat work surface, two pairs of knives comprising a top pairs of knives and a bottom pair of knives, the knives of each pair being arranged at an angle and being adjustable relative to each other to form a V-shaped cutting edge, at least one guide slot through said work table work surface, adjustable stop means mounted for longitudinal displacement in said one guide slot and a stop ledge mounted on said adjustable stop means, the improvement comprising: said adjustable stop means being provided in the form of an adjustment head having a housing, a slide guided in said guide slot, a drive shaft engaging said slide in said guide slot, a spindle mounted to said slide and supporting said adjustment head housing for rotation about an axis normal to said work surface, a motor supported by said housing and located above said work surface drive means connecting said motor for rotating said adjustment head about said spindle and a second motor for rotating said drive shaft to displace said slide in said guide slot.

2. The corner cutting machine as set forth in claim 1, wherein the adjustment head housing is shaped like a hood and said motor as well as the stop ledge is mounted to the hood and spaced a radial distance from said sprindle.

3. The corner cutting machine as set forth in claim 1 wherein said work-table work surface is bounded by a plurality of edges, said at least one guide slot includes two rectilinear guide slots provided in the work-table work surface for longitudinal displacement of a pair of adjustment heads and said two rectilinear-guide slots form an angle of 90° and converge toward one of said edges of the work table while maintaining symmetry with a plane normal to said one edge and passing through the tip of the V-shaped cutting edge.

4. The corner cutting machine as set forth in any one of the proceeding claims, wherein said work-table work surface is bounded by a plurality of edges including two lateral edges and the work table has shoulder bars on said lateral edges for extending the guide slots.

5. The corner cutting machine as set forth in claim 1 or 3 wherein each of said at least one guide slot extends perpendicularly through the work table work surface to a guide channel of substantially rectangular cross section, the top of each said guide channel is defined by two guide bars facing each other and said guide bars define said guide slot between them.

6. The corner cutting machine as set forth in claim 5 wherein a threaded spindle is provided in the guide channel of each of said at least one guide slot, each said threaded spindle is friction-locked to a motor drive mounted on the work table and each threaded spindle is drivingly engaged with a threaded sleeve rigidly connected to a slide.

7. The corner cutting machine as set forth in claim 6, wherein each said motor drive is connected to said threaded spindle by a gear train.

8. The corner cutting machine as set forth in claim 5, wherein one said slide is guided in each of said at least one guide slot and each slide consists of a lower block part mounted in the guide channel of the guide slot and an upper block part mounted on the work table and carrying a worm wheel, said lower block part rests with runners against the underside of the guide bars and said upper block part rests with runners on the upper side of the guide bars and said upper block is connected to said lower block part by fasteners projecting through said guide slot.

9. The corner cutting machine as set forth in claim 8, wherein said upper block part and said lower block part of said slide are connected together by interposition of springs therebetween.

10. The corner cutting machine as set forth in claim 8 wherein both said upper block part and said lower block part of said slide have guide shoulders that slidably engage form-fittingly in said guide slot.

11. The corner cutting machine as set forth in claim 3 wherein each of said adjustment heads has one said stop ledge mounted thereto said stop ledges being elongated and the length of said stop ledges mounted to the adjustment heads is adjustable.

12. The corner cutting machine as set forth in claim 11, wherein said stop ledges have sliding ledges that can be pulled out in the manner of a telescope.

13. The corner cutting machine as set forth in claim 12, wherein said sliding ledges each have a gear-rack-type toothing, which is in mesh with a motor drive attached to the adjustment head.

14. The corner cutting machine as set forth in claim 1 wherein said drive means consist of a worm wheel fixedly mounted on the slide concentric to the spindle and a worm shaft supported in said housing and connected to said, with the worm shaft acting tangentially upon the worm wheel.

15. The corner cutting machine as set forth in claim 14, wherein the housing of said adjustment head is pivoted to said spindle via antifrictin bearings.

16. The corner cutting machine as set forth in claim 1 wherein said drive shaft engaging said slide in said guide slot is a jackscrew actuator.

17. The corner cutting machine as set forth in claim 1 wherein the bottom knives are each attached to one of a pair of flat knife holders, a peripheral edge of each said knife holder has the form of an arc of a circle and each said knife holder is supported in a circular table recess in the plane of the work table and arranged to be moved on a circular path in said table recess for adjusting the cutting edge angle between the bottom knives.

18. The corner cutting machine as set forth in claim 17, wherein worm-wheel toothings are provided along said peripheral edges of said knife holders and said worm-wheel toothings are each meshed with one of a pair of tangentially mounted worm-drive shafts.

19. The corner cutting machine as set forth in claim 18, wherein a motor drive is provided as a rotary drive for the worm-drive shafts.

20. The corner cutting machine as set forth in claim 17 wherein guide shoulders are provided in said circular table recess and engage in arcuate guide recesses in said knife holders (75).

21. The corner cutting machine as set forth in any one of claims 1, 16 or 19, wherein the motor drives are numerically controlled, electric step motors.

22. The corner cutting machine as set forth in claim 21, characterized in that the motor drives are fixedly connected via connecting cables to a programmable, numerical control unit.

* * * * *